(12) United States Patent
Liu et al.

(10) Patent No.: US 9,870,421 B2
(45) Date of Patent: Jan. 16, 2018

(54) METHOD FOR ACCURATELY SEARCHING FOR COMPREHENSIVE INFORMATION

(71) Applicant: Sha Liu, Chongqing (CN)

(72) Inventors: Sha Liu, Chongqing (CN); Dongqin Yao, Chongqing (CN)

( * ) Notice: Subject to any disclaimer, the term of this patent is extended or adjusted under 35 U.S.C. 154(b) by 0 days.

(21) Appl. No.: 14/997,481

(22) Filed: Jan. 15, 2016

(65) Prior Publication Data
US 2016/0132587 A1    May 12, 2016

Related U.S. Application Data

(63) Continuation-in-part of application No. PCT/CN2014/082434, filed on Jul. 17, 2014.

(30) Foreign Application Priority Data

Jul. 25, 2013    (CN) .......................... 2013 1 0316070

(51) Int. Cl.
G06F 17/30    (2006.01)
G06F 17/24    (2006.01)

(52) U.S. Cl.
CPC ...... *G06F 17/30598* (2013.01); *G06F 17/248* (2013.01); *G06F 17/3064* (2013.01); *G06F 17/30539* (2013.01); *G06F 17/30542* (2013.01); *G06F 17/30684* (2013.01); *G06F 17/30719* (2013.01); *G06F 17/30864* (2013.01); *G06F 17/30917* (2013.01)

(58) Field of Classification Search
None
See application file for complete search history.

(56) References Cited

FOREIGN PATENT DOCUMENTS

JP    WO 2010061538 A1 *  6/2010  ....... G06F 17/30864

OTHER PUBLICATIONS

Chekuri et al. ("Web Search Using Automatic Classification"),1994, in Sixth World Wide Web Conference, pp. 1-11.*

* cited by examiner

*Primary Examiner* — Alexander Khong
(74) *Attorney, Agent, or Firm* — Wayne & Ken, LLC; Tony C. Hom (57) ABSTRACT

The present invention provides a method for accurate search of comprehensive information. By providing coordinates of an alternative pragmatic keyword indicating a function and a utility scope of target search information for any search keyword, a general topic keyword, a pragmatic keyword, a common keyword, and a combination result thereof are obtained, and structured information, structured summary information, structured mapping information, semi-structured information, and unstructured information are concurrently searched for on the Internet, so that complete search and accurate search of various types of information on the Internet can be implemented in one search attempt, thereby achieving an objective of improving Internet information search efficiency substantially.

4 Claims, 9 Drawing Sheets

Disadvantages of full-text keyword search (example)

Keywords are entered: Live telecast time of Rockets game

Results of full-text search—

Sequence ahead: No time to see live telecast of Rockets game.

Sequence behind: Live telecast of Rockets game: (target information)   23:00

Keywords are entered: IPHONE4 manufacture

Results of full-text search—

Sequence ahead: IPHONE4 manufacture launched new brand

Sequence behind: (target information) Apple Inc launched IPHONE4

Keywords are entered: Press conference of CQ High-tech Fair

Results of full-text search—

Sequence ahead: More information are provided by press publisher of CQ High-tech Fair

Sequence behind: (target information) the latest information of CQNEWS press conference of CQ High-tech Fair

Fig.1

| Any search keyword is entered (for example, NBA, National Development and Reform Commission, smartphone, cloud computing, Han Han, and European and American movies) | | | | | | | | | | | |
|---|---|---|---|---|---|---|---|---|---|---|---|
| Classification of pragmatic keyword | News | Notice | Knowledge | Product | Service | Communication | On-demand download, | Blog microblog | Forum | Yellow page | Others |
| Frequently used pragmatic keywords | Title | Title | Title | Title | Title | Title | Title | Title | Title | Title | No structural summary |
| | Body | Body | Problem | Product name | Service title | Purpose of communication, | Name | ... | ... | Types | |
| | Action | Content | Concept definition | Product description | Item | Gender | Brief introduction | ... | ... | Organization structuring | |
| | Time | Area | Principle explanation | Manufacture | Way | Age | Leading role | ... | ... | Contact information | |
| | Place | Object | Application method | Product price | Time | Occupation | Supplier | ... | ... | ... | |
| | Background | ... | ... | ... | ... | Strong point | ... | ... | ... | ... | |
| | Current situation | ... | ... | ... | ... | Hobby | ... | ... | ... | ... | |
| | Comment | ... | ... | ... | ... | Income | ... | ... | ... | ... | |
| | Overview | ... | ... | ... | ... | ... | ... | ... | ... | ... | |
| | Others | Others | Others | Others | Others | Others | Others | Others | Others | Others | |
| Data types: webpage☐ text☐ picture☐ audio☐ structural data☐ | | | | | | | | | | | |

| Classification | News | Notice | Knowledge | Product | Service | Communication | Download, On-demand | Others | |
|---|---|---|---|---|---|---|---|---|---|
| Pragmatic keywords | Topic keywords | Topic keywords | Topic keywords | Topic keywords | Topic keywords | Topic keywords | Topic keywords | Topic keywords | ..... |
| | Title | Title | Title | Title | Title | Title | Title | Free summary | |
| | Body | Body | Problem | Product name | Service title | Purpose of communication | Name | | |
| | Action | Content | Concept definition | Product description | Item | Gender | Brief introduction | | |
| | Time | Area | Principle explanation | Manufacture | Way | Age | Leading role | | |
| | ...... | ...... | ...... | ...... | ...... | ...... | ...... | | |
| | Others (free summary) | Others (free summary) | Others (free summary) | Others (free summary) | Others (free summary) | Others (free summary) | Others (free summary) | | |

General topic keywords are entered: Beijing Housing Accumulation Fund Loan
Classification of pragmatic keywords: service

Search results of structural information:
(Title): Beijing housing accumulation fund loan service
(Publisher): Beijing Baofucheng Real Estate Consultation Co. Ltd
(Service organization): Management center of Beijing housing accumulation fund loan agency
(Service address): Room 366, Huatong Mansion, No.19, West Street, Chegongzhuang, Haidian District   "Map Information"
(Service time): 9:00am-17:00pm
(Tel): 010-6000666
(Free summary): normally within 2 weeks from complete data to loan, maximum loan is RMB 800 thousand
Check detailed information for "Knowledge" of housing accumulation fund loan, information link address(bigjj.gov.cn......)

Full-text search results:
(Title): Beijing housing accumulation fund loan service
(Summary): the interest rate of Beijing housing accumulation fund loan is reduced from Sep 16, the rate is 0.18% reduction for loan below 5 years, and 0.09% reduction for loan over 5 years.
Detailed information......

More related search results
News: Beijing housing accumulation fund loan summary detailed information   more news
Notice: notice of adjusting rate of housing accumulation fund loan summary   detailed information   more notice
Service: accumulation fund management branch of each county summary detailed information   more service
Knowledge: charging standard of guarantee fee for personal accumulation fund loan   summary   detailed information
Download: reference table of equal monthly repayment for Beijing housing accumulation fund loan
summary detailed information    more downloads

| Template for mapping relations of product (example) | | |
|---|---|---|
| Comprehensive search structural items of webpage information | | Structural label in XX e-commerce of structured information databases |
| Topic keyword | Mandatory item | Keywords label |
| Title | | Title |
| Product name | Mandatory item | Product name |
| Product description | | Product ingredients, product model, and product manual... |
| Manufacture | Mandatory item | Manufacture |
| Product price | | Sales price |
| ... | | |
| ... | | |
| ... | | |
| Others | | Distributor |
| Information link address | Mandatory item of structured summary information | Information link address(containing virtual information link address) |

Fig.9

METHOD FOR ACCURATELY SEARCHING FOR COMPREHENSIVE INFORMATION

CROSS-REFERENCE TO RELATED APPLICATIONS

This application is a continuation-in-part of International Patent Application No. PCT/CN2014/082434 with an international filing date of Jul. 17, 2014, designating the United States, now pending, and further claims priority benefits to Chinese Patent Application No. 201310316070.3, filed Jul. 25, 2013. The contents of all of the aforementioned applications, including any intervening amendments thereto, are incorporated herein by reference.

TECHNICAL FIELD

The present invention relates to the field of computers and communications, and in particular, to a method for searching for information on the Internet.

BACKGROUND

Figure 1:
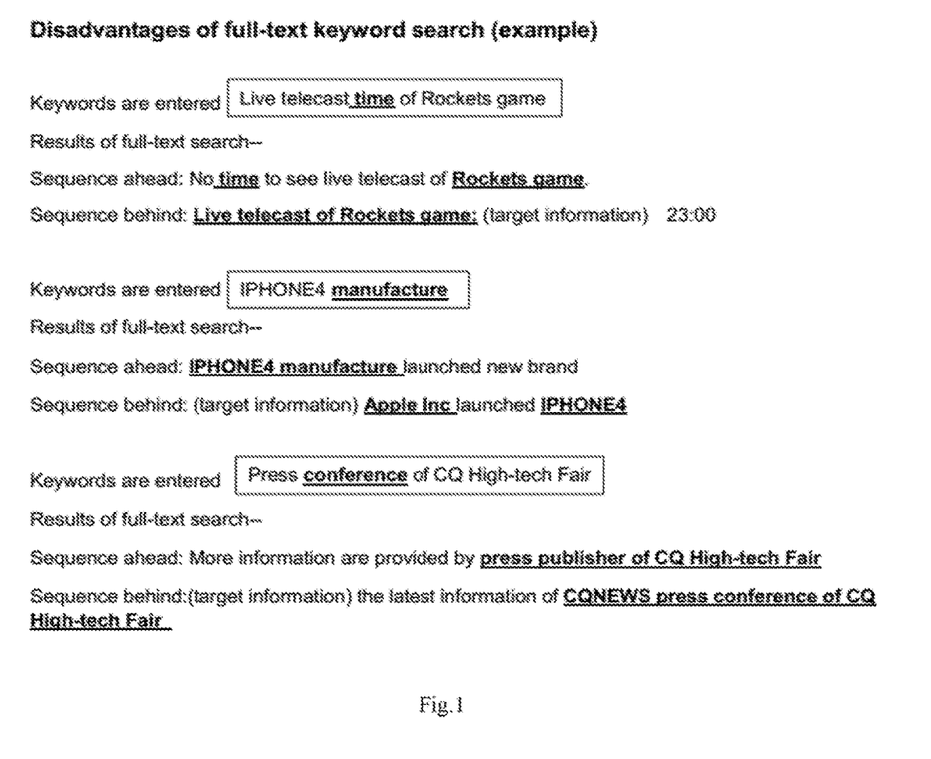
FIG. 1 is a schematic diagram of a disadvantage of full-text keyword search.

In the Internet information search field, full-text keyword search and structured information search are two most frequently used search methods. An advantage of the full-text keyword search is good search completeness, and a disadvantage is low search accuracy (referring to FIG. 1). An advantage of the structured information search is good search accuracy, and a disadvantage is search incompleteness. The problem that complete information search and accurate information search cannot be implemented concurrently not only restricts efficiency of comprehensive search of Internet information, but also directly causes a user searching for information to switch frequently between the full-text keyword search and search of various types of structured information. Therefore, how to substantially solve the problem that the complete information search and the accurate information search cannot be implemented concurrently is always the most important topic in the Internet information search field.

SUMMARY

To at least partially solve the foregoing problem in the prior art and obtain a beneficial technical effect, the present invention is developed.

According to an aspect of the present invention, a method for accurate search of comprehensive information is provided and includes the following steps: outputting a general topic keyword text box in a template for accurate search of comprehensive information, an alternative pragmatic keyword template, a common keyword text box under a pragmatic keyword, a search data type option, a search scope option, and a search operation instruction identifier; obtaining, in the general topic keyword text box, a general topic keyword entered by a searching user, obtaining, in the alternative pragmatic keyword template, a pragmatic keyword or a pragmatic keyword classification item selected by the searching user, and obtaining, under the pragmatic keyword selected by the user, a common keyword entered by the searching user; obtaining a search data type selection result and a search operation instruction, and before executing the search operation instruction, judging whether the obtained search keyword includes only the pragmatic keyword; if a judgment result is "Yes", outputting prompt information "please enter a keyword" or a synonym and a near-synonym, and not executing the search operation instruction; if a judgment result is "No", executing the search operation instruction, and using the obtained general topic keyword, the pragmatic keyword, the common keyword, and a combination result thereof to match various keywords in structured information, structured summary information, semi-structured information, and unstructured information of release information; and/or, using the obtained general topic keyword, the pragmatic keyword, and the common keyword to match various keywords in various types of structured release information that is on other websites outside a system and has already established a structural label mapping relationship with structural items in the template for accurate search of comprehensive information; and if the obtained search keyword and the combination result thereof match the keywords in the release information successfully, invoking corresponding information of the successfully matched structured information, structured summary information, semi-structured information, unstructured information, and various types of structured release information that has already established a structural label mapping relationship with the structural items in the template for accurate search of comprehensive information, for displaying, where: obtaining a pragmatic keyword classification item in the output alternative pragmatic keyword template is equivalent to obtaining all pragmatic keywords of the classification; the obtained pragmatic keywords may be a multiple-choice result; and the common keyword that is entered by the user and obtained under the selected pragmatic keyword may be multiple common keywords entered under multiple selected pragmatic keywords; and the method for obtaining a general topic keyword, a pragmatic keyword, and a common keyword may further include the following features: when obtaining the pragmatic keyword selected by the searching user, synchronously obtaining an application function selection result of the pragmatic keyword; when the obtained application function selection result of the pragmatic keyword is "invoke related information" and a synonym or a near-synonym, determining that the obtained pragmatic keyword is a pragmatic keyword indicating an invoked information scope of the obtained general topic keyword; and when the obtained application function selection result of the pragmatic keyword is "enter a keyword in a specified scope" and a synonym or a near-synonym, outputting a search keyword input interface under the pragmatic keyword, and obtaining a common keyword entered under the pragmatic keyword, where: before using the obtained general topic keyword, the pragmatic keyword, and the common keyword to match various keywords in various types of structured release information that is on other websites outside a system and has already established a structural label mapping relationship with structural items in the template for accurate search of comprehensive information, the method further includes the following steps: outputting a template for setting a mapping relationship between preset structural items in the template for accurate search of comprehensive information and structural labels in the structured release information and structured summary release information on other websites outside the system; and obtaining a result of setting the mapping relationship between the preset structural items in the template for accurate search of comprehensive information and the structural labels in various types of structured release information on other websites outside the system.

Further, the method for using the general topic keyword, the pragmatic keyword, the common keyword entered under the pragmatic keyword, and a combination result thereof to match structured summary information, common structured information, semi-structured information, and unstructured information, and invoking the successfully matched structured summary information, common structured information, structured mapping information, semi-structured information, and unstructured information, for displaying further includes the following features: when the obtained search keyword and combination result are used to match a keyword in the structured information, the structured summary information, and various types of structured release information that is on other websites outside the system and has already established a structural label mapping relationship with the structural items in the template for accurate search of comprehensive information, if the obtained search keyword includes only a general topic keyword, matching a release information keyword under structural labels "topic keyword" and "title" of the structured release information, and also matching structural labels of various types of structured information; if the matching succeeds, invoking the whole piece of structured information that is matched successfully for displaying; if the obtained search keyword includes a general topic keyword and a pragmatic keyword of which the application function is "invoke related information", after the general topic keyword is matched successfully, judging whether there is content under a structural label of the release information matching the pragmatic keyword; if a judgment result is "Yes", invoking structured information that matches both the general topic keyword and the pragmatic keyword successfully for displaying; and; if the obtained search keyword includes a general topic keyword, a pragmatic keyword, and a common keyword obtained under the pragmatic keyword, using the obtained search keyword to match corresponding information in the structured release information in a combined manner and in an individual manner; if the matching succeeds, preferentially invoking structured information that is matched successfully in a combined manner for displaying; or when the obtained search keyword and combination result are used to match a keyword in the semi-structured information and the unstructured information, if the obtained search keyword includes only a general topic keyword, using the obtained general topic keyword to match a keyword in a full-text keyword ordering table, and also using the obtained general topic keyword to match an annotation word of a pragmatic keyword in the release information, and invoking release information that is matched successfully for displaying; and if the obtained search keyword includes a general topic keyword and a pragmatic keyword or includes a general topic keyword, a pragmatic keyword, and a common keyword obtained under the pragmatic keyword, using the obtained general topic keyword and common keyword to match a keyword in the full-text keyword ordering table, using the obtained pragmatic keyword to match an annotation word of a pragmatic keyword in the release information, and using the obtained pragmatic keyword to match a keyword that can be clearly determined as a pragmatic keyword in the full-text keyword ordering table; if the matching succeeds, preferentially invoking information successfully matching the keyword that can be clearly determined as a pragmatic keyword for displaying.

Further, the method for obtaining a result of setting the mapping relationship between the preset structural items in the template for accurate search of comprehensive information and the structural labels in various types of structured release information further includes: outputting a template for setting a mapping relationship between preset structural items in the template for accurate search of comprehensive information and structural labels in other structured release information and structured summary release information; and obtaining a result of setting the mapping relationship between the preset structural items in the template for accurate search of comprehensive information and the structural labels in various types of structured release information, where: one preset structural item in the template for accurate search of comprehensive information have a mapping relationship with multiple structural labels in a template for releasing other structured information; the obtained mapping relationship between the preset structural items in the template for accurate search of comprehensive information and the structural labels in the template for releasing other structured information may be an incomplete mapping relationship; and the outputting a template for setting a mapping relationship between the preset structural items in the template for accurate search of comprehensive information and structural labels in other structured information, the structured summary information, and various types of structured release information that has already established a structural label mapping relationship with the structural items in the accurate template for accurate search of comprehensive information may be outputting a template for setting a mapping relationship of structural labels in the structured summary information and a template for setting a mapping structural labels in the common structured information respectively, or may be outputting a mixed template for setting a mapping relationship of structural labels in the structured summary information and a mapping relationship of structural labels in the common structured information.

Further, if the obtained search keyword and the combination result match the keywords in the release information successfully, the method for invoking corresponding information of the successfully matched structured information, structured summary information, semi-structured information, unstructured information, and various types of structured release information that has already established a structural label mapping relationship with the structural items in the template for accurate search of comprehensive information, for displaying further comprises: displaying the invoked information by using the structural items in the template for accurate search of comprehensive information, or may be displaying the invoked information by using user-defined structural items in various types of structured information databases.

In the present application, complete search and accurate search of various types of Internet information can be implemented in one search attempt, so that an objective of improving Internet information search efficiency substantially can be achieved.

BRIEF DESCRIPTION OF DRAWINGS

To enable a person skilled in the art to understand the present invention clearly and implement the present invention, the following provides accompanying drawings that constitute a part of the specification, but all features shown in the accompanying drawings should not be understood as necessary for achieving the technical effect of the present application. The inclusive scope of the present application is not limited by the accompanying drawings, but is limited by the appended claims.

FIG. 6 is a schematic diagram of an accurate search result of comprehensive information;

DESCRIPTION OF EMBODIMENTS

The following describes exemplary implementation manners of the present invention in detail with reference to the accompanying drawings. These exemplary implementation manners are provided to enable a person of ordinary skill in the art to understand the present invention clearly and implement the present invention according to descriptions herein. The accompanying drawings, exemplary specific implementation manners, and preferred implementation manners are not intended to limit the present invention, and the scope of the present invention is limited by the appended claims.

To solve the foregoing problem, the inventor of the present application first makes a systematic analysis on a root reason why accurate search of information cannot be implemented by using full-text keyword search, and draws the following conclusion:

Of full-text search keywords, there are two types of keywords with totally different application functions, that is, a topic keyword that locks a content topic of target information and a pragmatic keyword that locks an application function and a utility scope of target information. Vividly speaking, the topic keyword is equivalent to an anchor word that locks the target search information, while the pragmatic keyword is equivalent to a longitude and latitude that locks the application function and the utility scope of the target search information. Only when a search keyword entered by a user is clearly distinguished as a topic keyword or a pragmatic keyword and search is implemented by combining the topic keyword and the pragmatic keyword, can the target information needed by the searching user be clearly locked and accurate full-text keyword information search be implemented.

For example, when the searching user enters a same keyword "smartphone manufacturer" in a full-text keyword text box, there are actually two different requirements for target information. One requirement is searching completely, that is, wanting to search for all information related to "smartphone manufacturer". In this case, the search keyword "smartphone manufacturer" entered by the user is the topic keyword of the target search information. The other requirement is searching accurately, that is, the user wants to search for only a specific name of a smartphone manufacturer (for example, Apple or Samsung). In this case, in the search keyword "smartphone manufacturer" entered by the user, "smartphone" is the topic keyword indicating the target information, while "manufacturer" is the pragmatic keyword indicating the function and the utility scope of the target information. Only when the search keyword "manufacturer" entered by the user is distinguished as the topic keyword or the pragmatic keyword, can the target information needed by the searching user be clearly locked and accurate full-text keyword information search be implemented.

Figure 2:
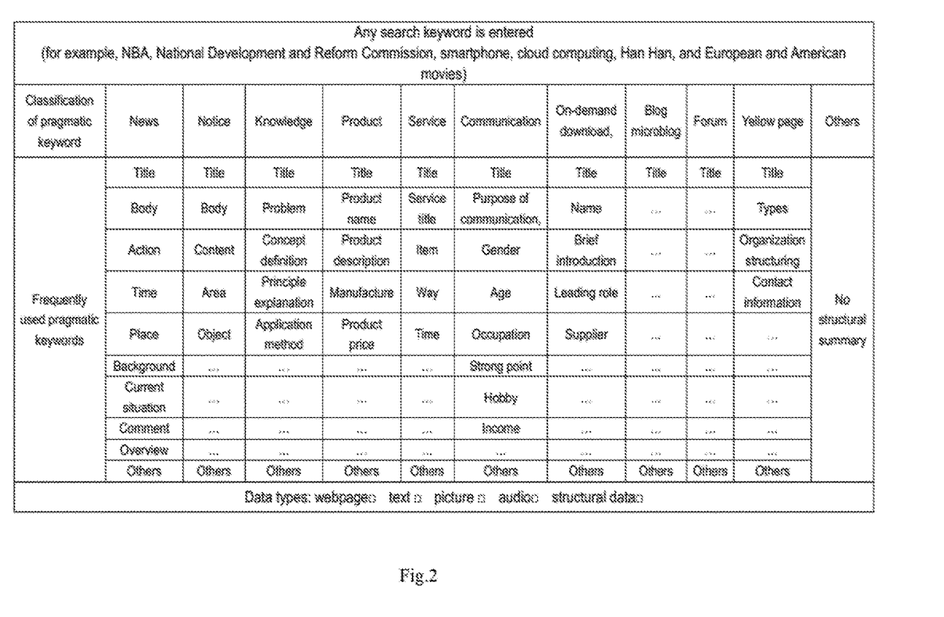
FIG. 2 is a schematic diagram of a double ten law of pragmatic keywords.

According to the foregoing conclusion, the inventor further makes a systematic analysis on various types of pragmatic keywords involved in the full-text keyword search result, and finds a "double ten law" of the pragmatic keywords of the Internet information, that is, when any search keyword is entered, there are approximately 10×10 frequently used pragmatic keywords indicating the application function and the utility scope of the target search information. Referring to FIG. 2, FIG. 2 is a schematic diagram of a double ten law of pragmatic keywords.

The law is detailed as follows: When any search keyword (for example, NBA, National Development and Reform Commission, smartphone, cloud computing, Han Han, and European and American movies) is entered, a frequently used pragmatic keyword of the search keyword has approximately 10 classification items (for example, news, notice, knowledge, product, service, communication, on-demand, download, forum, and yellow page), and each classification item also has approximately 10 frequently used pragmatic keywords. For example, frequently used pragmatic keywords of "news" include "title, body, action, time, place, background, comment, and overview", while frequently used pragmatic keywords of "communication" (including recruitment, application, marriage-seeking, and friend-making" include purpose of communication, age, gender, occupation, education, character, and hobby).

Figure 3:
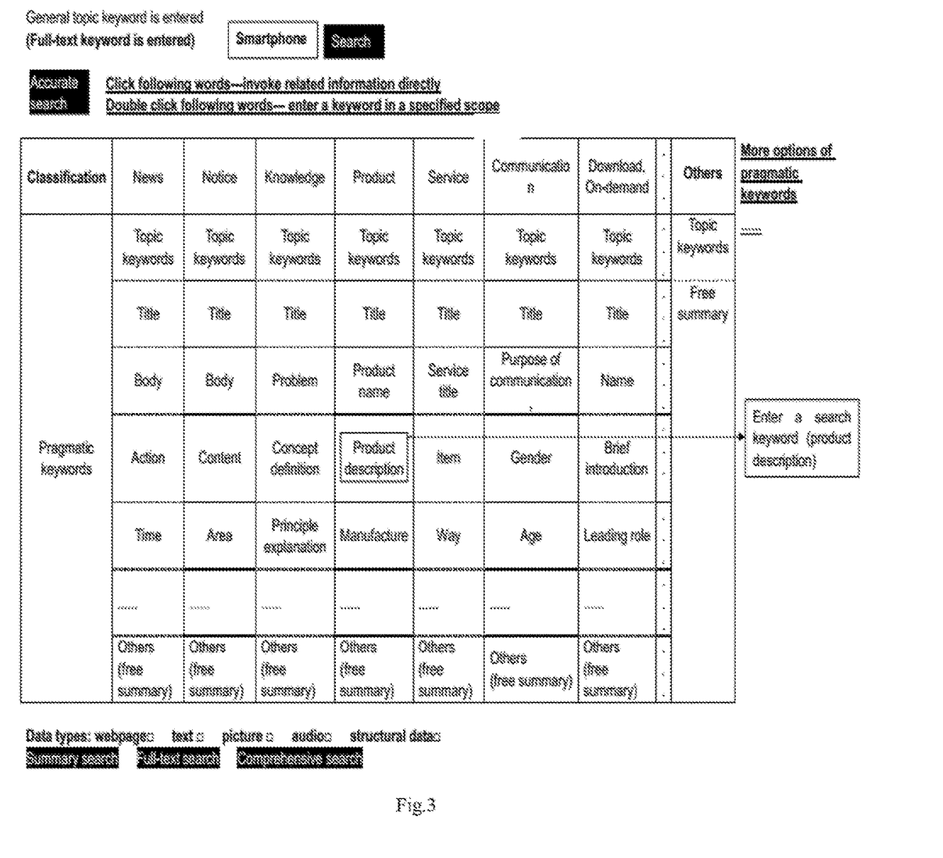
FIG. 3 is a schematic diagram of a template for accurate search of comprehensive information in a PC version.

The inventor realizes that because the foregoing double ten law of pragmatic keywords discloses only a limited number of frequently used pragmatic keywords but the law has proved to be relatively stable through a long-term search practice, a template for frequently used alternative programmatic keywords may be provided, so that the searching user enters any keyword in the full-text keyword text box and selects a pragmatic keyword needed by the searching user in the alternative pragmatic keyword template (referring to FIG. 3). In this way, the objective of clearly distinguishing the topic keyword and the pragmatic keyword from the search keywords and locking the target search information accurately is achieved.

Pragmatic keywords that are infrequently used may be directly classified into an "other" type and an "other" item of preset pragmatic keywords, or may be set to subordinate words of preset frequently used pragmatic keywords. In addition, the user may extend freely in "more pragmatic keyword option", and the search system automatically adjusts, according to a frequency of use, the sequence of frequently used pragmatic keywords and classification words in the alternative pragmatic keyword template to ensure efficiency of locating target information of the alternative pragmatic keywords (referring to FIG. 3).

The inventor further realizes that because the frequently used pragmatic keywords disclosed by the double ten law have an obvious structured feature, the frequently used pragmatic keywords may be directly used as general structural labels for structured information search, so that an objective of concurrently searching for unstructured information and structured information is achieved when the user enters a search keyword at a time.

The inventor also realizes that because there are great differences between structural labels of tens of thousands of pieces of structured information on the Internet, the quantity of structured information searched out directly by using a general structural label may be very limited. However, because the frequently used pragmatic keywords disclosed by the double ten law have universality for any keyword, complete search for various types of structured information may be implemented by establishing a mapping relationship between the frequently used pragmatic keywords in the double ten law and structural labels in various types of structured information, which substantially solves the problem that complete search and accurate search cannot be implemented concurrently.

On the basis of the foregoing analysis result, the present invention provides a method for accurate search of comprehensive information. By providing coordinates of an alternative pragmatic keyword indicating a function and a utility scope of target search information for any search keyword, a general topic keyword, a pragmatic keyword, a common keyword, and a combination result thereof are obtained, and structured information, structured summary information, structured mapping information, semi-structured information, and unstructured information are concurrently searched for on the Internet, so that complete search and accurate search of various types of information on the Internet can be implemented in one search attempt, thereby achieving an objective of improving Internet information search efficiency substantially.

Figure 4:
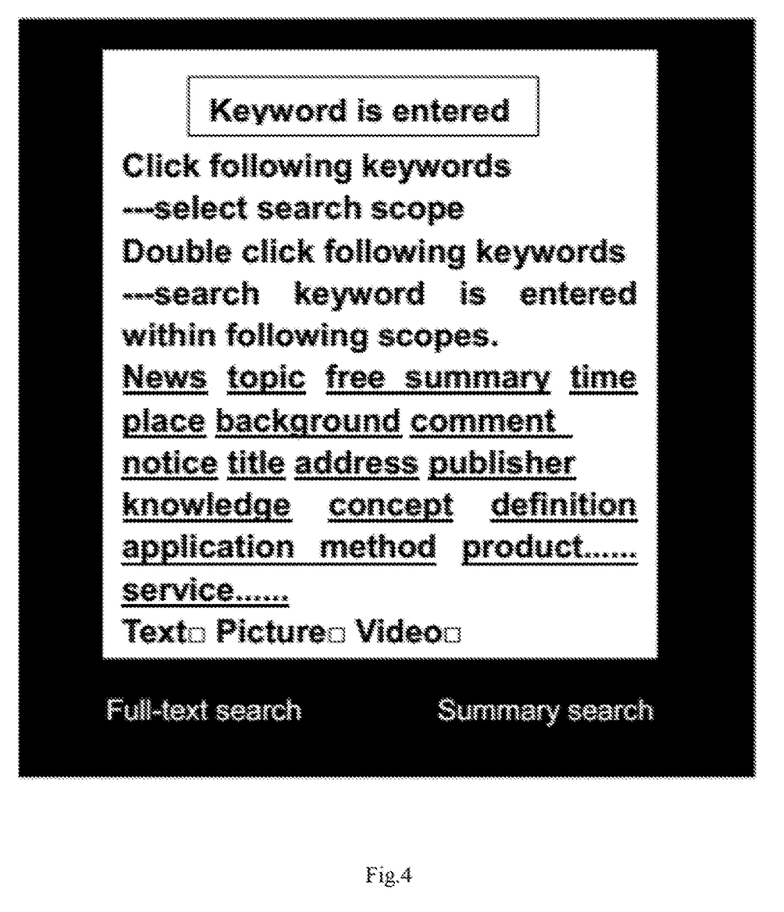
FIG. 4 is a schematic diagram of a template for accurate search of comprehensive information in a mobile phone version.

Referring to FIG. 3 and FIG. 4, a template for accurate search of comprehensive information in the present invention and embodiments thereof refers to a man-machine interaction operation template for obtaining an accurate search keyword and related information. Preset structural items in this template include but are not limited to a general topic keyword text box, an alternative pragmatic keyword template, a common keyword text box under a pragmatic keyword, a search data type (for example, text, picture, and audio) option, a search scope (summary search, full-text search, and mixed search) option, and a search operation instruction identifier.

The general topic keyword refers to any keyword and a word segmentation result obtained in the general topic keyword text box; the general topic keyword text box refers to a text box where a user enters any keyword (an existing keyword text box for full-text keyword search may be directly used); the pragmatic keyword refers to a keyword and a subordinate pragmatic keyword indicating a function and a utility scope of target search information; the subordinate pragmatic keyword refers to a pragmatic keyword having a narrower sense than a superordinate pragmatic keyword (for example, a subordinate pragmatic keyword of a pragmatic keyword "product description" may include "product ingredients" and "product model"); the alternative pragmatic keyword template refers to a man-machine interaction template that has preset frequently used pragmatic keywords and classification items and is provided for the user to perform accurate search of comprehensive information; and the common keyword refers to any keyword and a word segmentation result obtained under the pragmatic keyword.

As shown in FIG. 3, a keyword text box at the top is a general topic keyword text box, and "smartphone" in the text box refers to a general topic keyword entered by a user; a pragmatic keyword template under the general topic keyword text box is an alternative pragmatic keyword template with preset frequently used pragmatic keywords and classification items; a rightmost "more pragmatic keyword option" refers to more infrequently used pragmatic keywords and classification results thereof provided by a webpage information search template; a text box indicated by a related arrow of a pragmatic keyword "product description" added with a double square box refers to a text box for entering a common keyword under the pragmatic keyword "product description"; "text □, picture □, and audio □" at the lowermost side in FIG. 3 refers to an option of a search object data type, and an identifier marked with characters "full-text search", "summary search", or "comprehensive search" refers to an identifier of a user operation option for obtaining a search scope and executing a search operation instruction.

In the present invention, the structured information, the structured summary information, and various types of structured release information that has already established a structural label mapping relationship with structural items in the template for accurate search of comprehensive information include but are not limited to structural labels in a relational database and release information under the structural labels; the semi-structured information includes but is not limited to information that has structural labels but does not store related content in the form of a relational database; and the unstructured information includes but is not limited to information that does not have structural labels except a file name.

The identifier "full-text search" of a user operation option may refer to searching for unstructured information of all webpage information other than a structured summary; the "summary search" may refer to searching for various types of structured summary information and common structured information; the "comprehensive search" may refer to performing "full-text search" and "summary search" concurrently; and the structured summary information refers to structured information that provides structural items of detailed information link addresses, where each structural item has a specific limit of a data amount corresponding to a data amount of summary information.

Embodiment 1: A Method for Accurate Search of Comprehensive Information

Reference may be made to FIG. 2, FIG. 3, FIG. 4, and FIG. 5.

Figure 5:
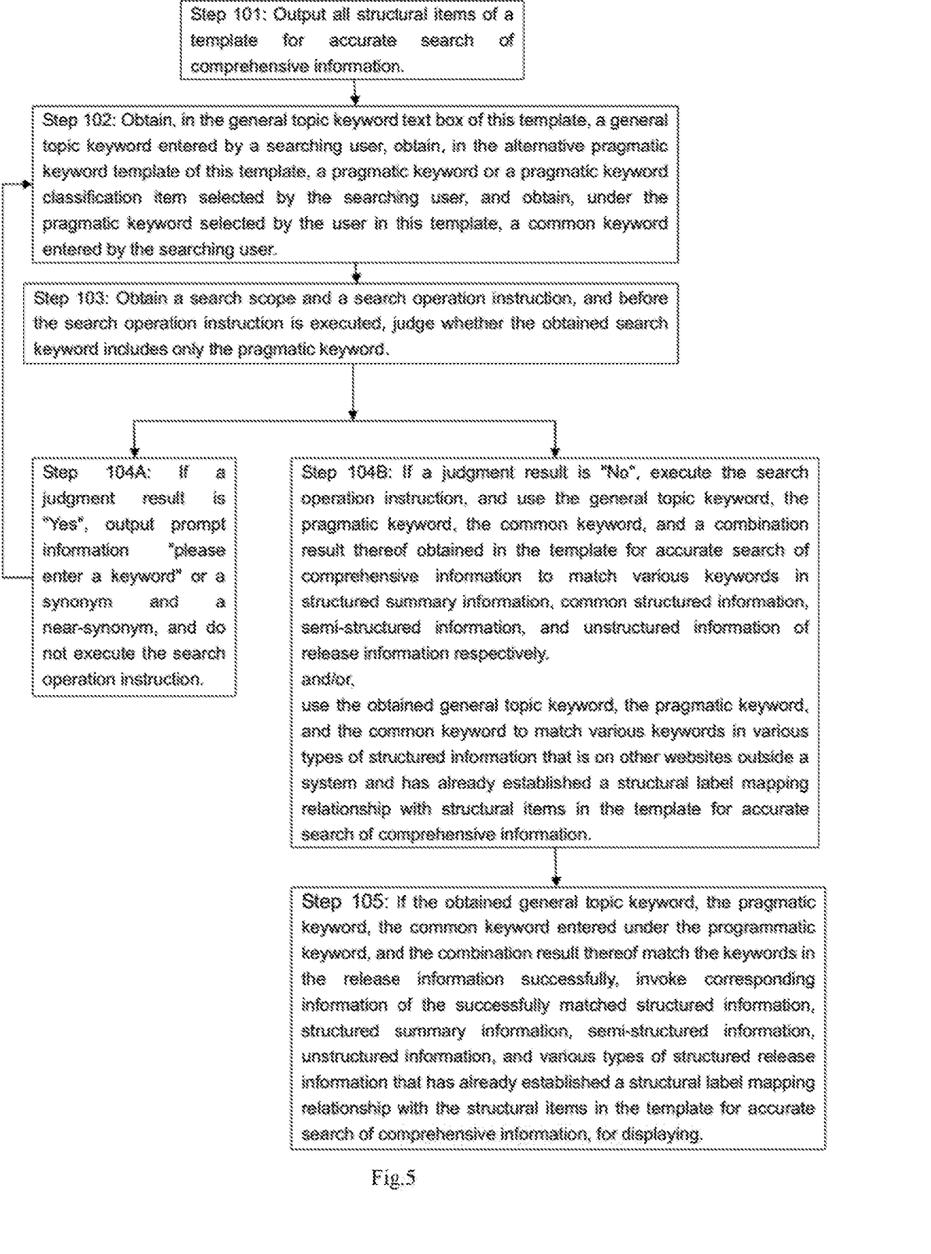
FIG. 5 is a main flowchart of a method for accurate search of comprehensive information.

A method for accurate search of comprehensive information is used to achieve an objective of improving Internet information search efficiency substantially, and a main process of this method includes the following steps:

Step 101: Output all structural items of a template for accurate search of comprehensive information.

The specific method may be as follows: An "accurate search of comprehensive information" identifier may be provided under the full-text keyword search box shown in FIG. 3, and when an "accurate search of comprehensive information" operation instruction is obtained, other structural items than "general topic keyword" in the template for accurate search of comprehensive information are output.

Step 102: Obtain, in the general topic keyword text box of this template, a general topic keyword entered by a searching user, obtain, in the alternative pragmatic keyword template of this template, a pragmatic keyword or a pragmatic keyword classification item selected by the searching user, and obtain, under the pragmatic keyword selected by the user in this template, a common keyword entered by the searching user.

Obtaining a pragmatic keyword classification item selected by the user in the output alternative pragmatic keyword template is equivalent to obtaining all pragmatic keywords of this classification; the obtained pragmatic keywords may be a multiple-choice result; and the common keyword that is entered by the user and obtained under the selected pragmatic keyword may be multiple common keywords entered under multiple selected pragmatic keywords.

For example, obtaining "news" in the pragmatic keyword classification item selected by the user in the alternative keyword template is equivalent to obtaining all alternative pragmatic keywords under the "news" classification; obtaining a pragmatic keyword in the alternative pragmatic keyword template may be obtaining a pragmatic keyword "product name" of the searching user under the pragmatic keyword classification item "product", and may also be obtaining "product description". In addition, entering a common keyword under multiple selected pragmatic keywords may be obtaining a common keyword "smartphone" entered under the selected pragmatic keyword "product name", and may also be obtaining a common keyword "product model" entered under the pragmatic keyword "product description".

Step 103: Obtain a search scope and a search operation instruction, and before the search operation instruction is executed, judge whether the obtained search keyword includes only the pragmatic keyword.

For example, in the search scope and the operation instruction shown in FIG. 3, an operation instruction "full-text search", "summary search", or "comprehensive search" is obtained. In addition, before the search operation instruction is executed, whether only a pragmatic keyword is obtained in the template for accurate search of comprehensive information is judged.

Step 104A: If a judgment result is "Yes", output prompt information "please enter a keyword" or a synonym and a near-synonym, and do not execute the search operation instruction.

Step 104B: If a judgment result is "No", execute the search operation instruction, and use the general topic keyword, the pragmatic keyword, the common keyword, and a combination result thereof obtained in the template for accurate search of comprehensive information to match various keywords in structured summary information, common structured information, semi-structured information, and unstructured information of release information respectively.

and/or, use the obtained general topic keyword, the pragmatic keyword, and the common keyword to match various keywords in various types of structured information that is on other websites outside a system and has already established a structural label mapping relationship with structural items in the template for accurate search of comprehensive information.

Step 105: If the obtained general topic keyword, the pragmatic keyword, the common keyword entered under the programmatic keyword, and the combination result thereof match the keywords in the release information successfully, invoke corresponding information of the successfully matched structured information, structured summary information, semi-structured information, unstructured information, and various types of structured release information that has already established a structural label mapping relationship with the structural items in the template for accurate search of comprehensive information, for displaying.

Because there are abundant methods for matching and invoking the structured information, the structured summary information, the semi-structured information, and the unstructured information in the release information by using the obtained general topic keyword, the pragmatic keyword, the common keyword entered under the pragmatic keyword, and the combination result thereof, the following describes only a basic matching and invoking method;

when the obtained search keyword and combination result are used to match a keyword in the structured information and the structured summary information (including various types of structured release information that has already established a structural label mapping relationship with the structural items in the template for accurate search of comprehensive information, if the obtained search keyword includes only a general topic keyword, matching a release information keyword under structural labels "topic keyword" and "title" of the structured release information, and also matching a structural label of various types of structured information (for example, using a word segmentation result "manufacturer" of a general topic keyword "smartphone manufacture" to match a structural label identifier "manufacturer" of the structured information"); if the matching succeeds, invoking a whole piece of structured information that is matched successfully for displaying (referring to Chinese Patent Application No. 201010507511.4, entitled "METHOD AND APPARATUS FOR RELEASING AND SEARCHING FOR INFORMATION");

if the obtained search keyword includes a general topic keyword and a pragmatic keyword of which the application function is "invoke related information", after the general topic keyword is matched successfully, judging whether there is content under a structural label of the release information matching the pragmatic keyword; if a judgment result is "Yes", invoking structured information that matches both the general topic keyword and the pragmatic keyword successfully for displaying; and if the obtained search keyword includes a general topic keyword, a pragmatic keyword, and a common keyword obtained under the pragmatic keyword, using the obtained search keyword to match corresponding information in the structured release information in a combined manner and in an individual manner; if the matching succeeds, preferentially invoking structured information that is matched successfully in a combined manner for displaying; or when the obtained search keyword and combination result are used to match a keyword in the semi-structured information and the unstructured information, if the obtained search keyword Includes only a general topic keyword, using the obtained general topic keyword to match a keyword in a full-text keyword ordering table, and also using the obtained general topic keyword to match an annotation word of a pragmatic keyword in the release information, and invoking release information that is matched successfully for displaying, where:

the annotation word of the pragmatic keyword refers to a pragmatic keyword that indicates an application function and a utility scope of a release information keyword and is automatically or manually added to a keyword in the full-text keyword ordering table (referring to Chinese Patent Application No. 201010507511.4, entitled "METHOD AND APPARATUS FOR RELEASING AND SEARCHING FOR INFORMATION" and Chinese Patent Application No. 201310056930.4, entitled "METHOD AND APPARATUS FOR SEARCHING FOR SUPERORDINATE WORD"); and if the obtained search keyword includes a general topic keyword and a pragmatic keyword or includes a general topic keyword, a pragmatic keyword, and a common keyword obtained under the pragmatic keyword, using the obtained general topic keyword and common keyword to match a keyword in the full-text keyword ordering table, using the obtained pragmatic keyword to match an annotation word of a pragmatic keyword in the release information, and using the obtained pragmatic keyword to match a keyword that can be clearly determined as a pragmatic keyword in the full-text keyword ordering table; if the matching succeeds, preferentially invoking information that successfully matches the keyword clearly determined as a pragmatic keyword for displaying (referring to Chinese Patent Application No. 201210256566.1, entitled "METHOD AND APPARATUS FOR SEARCHING FOR PRAGMATIC KEYWORD").

Main practical value of Embodiment 1 of the present invention is as follows: By providing a template for accurate search of comprehensive information and obtaining a general topic keyword, a pragmatic keyword, a common keyword under the pragmatic keyword, and a combination result thereof that a user enters and selects in the template for accurate search of comprehensive information, target information needed by the searching user may be clearly locked; structured information (including various types of structured release information that has already established a structural label mapping relationship with structural items in the template for accurate search of comprehensive information), structured summary information, semi-structured information, and unstructured information are matched concurrently; and related information that successfully matches the keyword is directly invoked.

Embodiment 2: A Method for Obtaining a General Topic Keyword, a Pragmatic Keyword, and a Common Keyword in a Template for Accurate Search of Comprehensive Information A same pragmatic keyword may have two different application functions: one application function is indicating an invoked information scope of a topic keyword, and the other application function is limiting a search scope of a keyword.

For example, when a pragmatic keyword "manufacturer" obtained from an alternative pragmatic keyword template is combined with an obtained general topic keyword "smartphone", an application function of the pragmatic keyword "manufacturer" indicates an invoked information scope of the topic keyword "smartphone"; when the obtained pragmatic keyword "manufacturer" is combined with a common keyword "smartphone" under the pragmatic keyword, the pragmatic keyword "manufacturer" is a pragmatic keyword used for limiting a search scope of the common keyword (for example, "smartphone").

Figure 7:
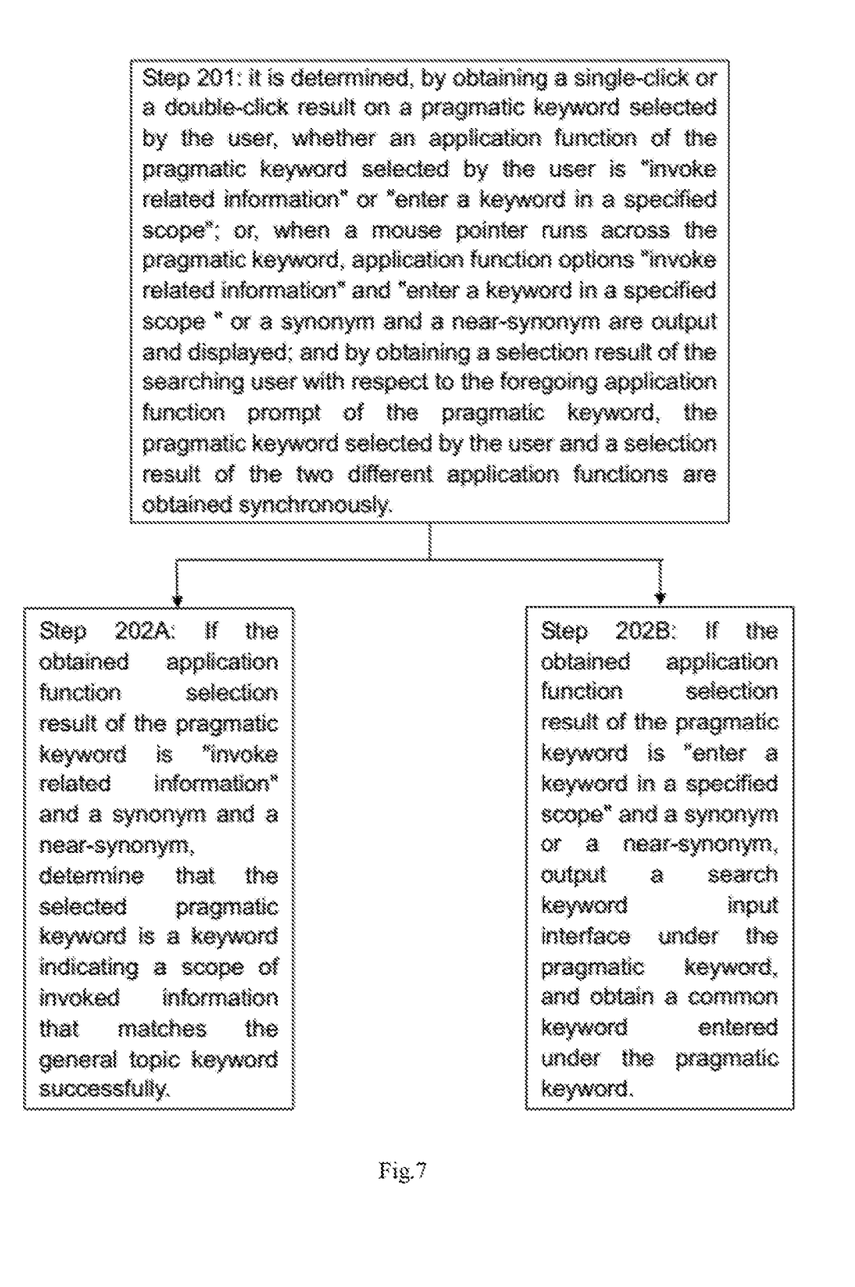
FIG. 7 is a main flowchart of a method for obtaining a search keyword.

Therefore, to clearly distinguish two different application functions of a pragmatic keyword, the present invention further provides a method for obtaining a general topic keyword, a pragmatic keyword, and a common keyword in a template for accurate search of comprehensive information, where the method includes the following steps:

Reference may be made to FIG. 3 and FIG. 7.

Step 201: When obtaining a pragmatic keyword selected by a searching user, synchronously obtain an application function selection result of the pragmatic keyword.

For example, it is determined, by obtaining a single-click or a double-click result on a pragmatic keyword selected by the user, whether an application function of the pragmatic keyword selected by the user is "invoke related information" or "enter a keyword in a specified scope"; or, when a mouse pointer runs across the pragmatic keyword, application function options "invoke related information" and "enter a keyword in a specified scope" or a synonym and a near-synonym are output and displayed; and by obtaining a selection result of the searching user with respect to the foregoing application function prompt of the pragmatic keyword, the pragmatic keyword selected by the user and a selection result of the two different application functions are obtained synchronously.

Step 202A: If the obtained application function selection result of the pragmatic keyword is "invoke related information" and a synonym and a near-synonym, determine that the selected pragmatic keyword is a keyword indicating a scope of invoked information that matches the general topic keyword successfully.

Step 202B: If the obtained application function selection result of the pragmatic keyword is "enter a keyword in a specified scope" and a synonym or a near-synonym, output a search keyword input interface under the pragmatic keyword, and obtain a common keyword entered under the pragmatic keyword.

Practical value of Embodiment 2 of the present invention is as follows: Different application functions of a same pragmatic keyword may be clearly distinguished, a searching user may easily understand application relationships of a general topic keyword, a pragmatic keyword, and a common keyword, and a user operation method for searching for different types of information may also be simplified maximally.

Embodiment 3: A Method for Mapping and Search of Structural Items in a Template for Accurate Search of Comprehensive Information and Other Structured Release Information on Other Websites Outside a System Various types of structured release information (including structured summary information) on the Internet have a lot of application functions, and even a same or similar application function has different structural labels. In addition, these structural labels may be changed at any time. If a general topic keyword, a pragmatic keyword, a common keyword, and a combination thereof obtained in a template for accurate search of comprehensive information are merely used to match structured information in release information directly, only structured information that is consistent with preset structural labels in the template for accurate search of comprehensive information can be searched for directly.

Figure 8:
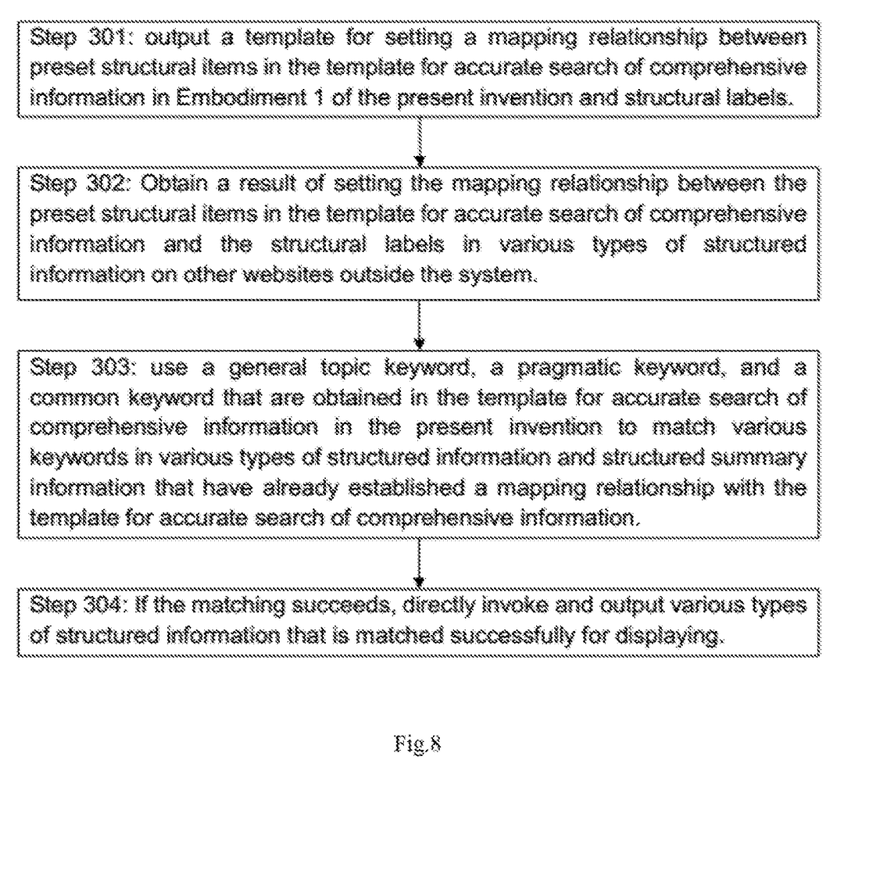
FIG. 8 is a main flowchart of a method for mapping and search of structured information.
Figure 9:
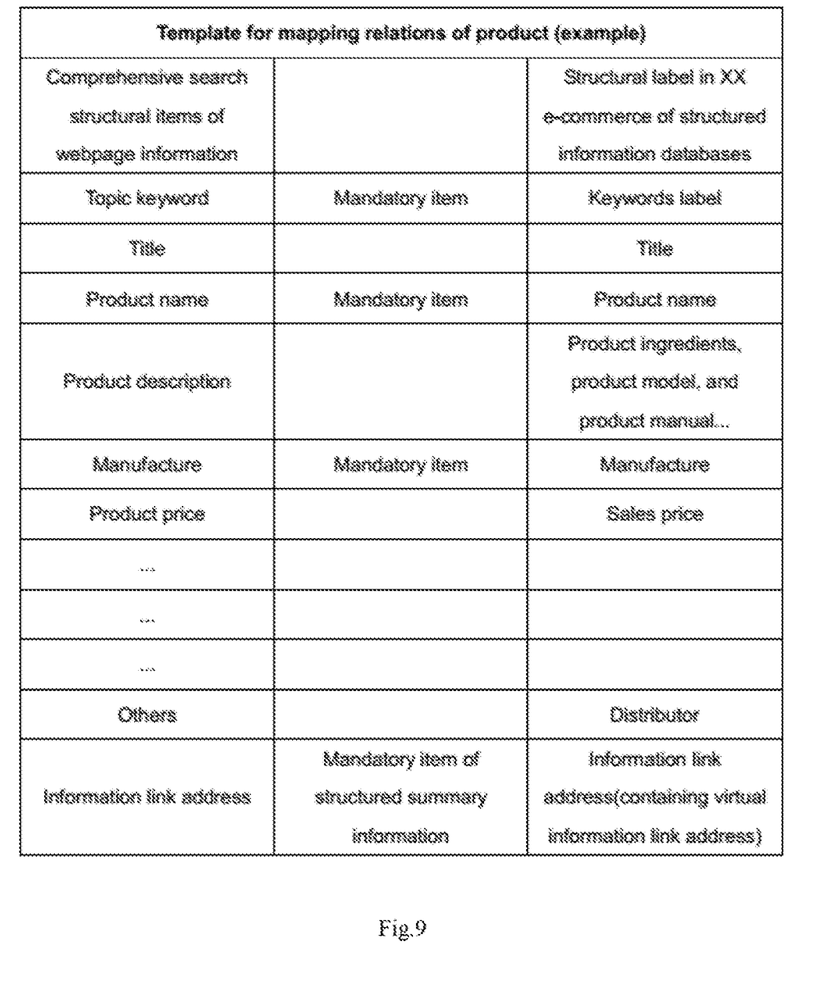
FIG. 9 is a schematic diagram of a method for mapping structured information.

Therefore, the present invention further provides a method for mapping and search of preset structural items in a template for accurate search of comprehensive information and structured release information on other websites outside a system to achieve an objective of searching for various types of structured information and structured summary information in the accurate search of comprehensive information. The method includes the following steps:

Reference may be made to FIG. 8 and FIG. 9.

Step 301: Before Embodiment 1 is executed, output a template for setting a mapping relationship between preset structural items in the template for accurate search of comprehensive information in Embodiment 1 of the present invention and structural labels in structured information and structured summary information on other websites outside a system.

A template for setting a mapping relationship of structural labels in a structured summary and a template for setting a mapping relationship of structural labels in common structured information may be output respectively, or a mixed template (referring to FIG. 9) for setting a mapping relationship of structural labels in structured summary information and a mapping relationship of structural labels in common structured information may be output.

The output template for setting a mapping relationship is provided with mandatory mapping relationship structural items and optional mapping relationship structural items, for example, "topic keyword" is a mandatory mapping relationship structural item, while "detailed information link address" is a mandatory mapping structural item in the structured summary information.

Step 302: Obtain a result of setting the mapping relationship between the preset structural items in the template for accurate search of comprehensive information and the structural labels in various types of structured information on other websites outside the system.

One preset structural item in the template for accurate search of comprehensive information have a mapping relationship with multiple structural labels in a template for releasing structured information on other websites outside the system.

For example, structural labels "product ingredients", "product model", and "product manual" in a template for releasing structured information may be mapped to a same preset structural item "product description" in the template for accurate search of comprehensive information.

The obtained mapping relationship between the preset structural items in the template for accurate search of comprehensive information and structural items in the template for releasing other structured information may be an incomplete mapping relationship.

For example, all structural labels in the template for releasing other structured information may be partially mapped to the preset structural items in the template for accurate search of comprehensive information.

Topic keywords on various websites may be mapped to subordinate pragmatic keywords of the preset pragmatic keywords in the template for accurate search of comprehensive information.

For example, topic keywords (for example, "friend-making" and "marriage-seeking") on friend-making and marriage-seeking websites are mapped to alternative subordinate pragmatic keywords "friend-making" and "marriage-seeking" of a pragmatic keyword "purpose of communication" under an "interpersonal communication" classification in a preset structural item of the template for accurate search of comprehensive information.

Structural labels that cannot establish a mapping relationship with the preset structural items in the template for accurate search of comprehensive information may be mapped to a pragmatic keyword "other" type or "other" item in the template for accurate search of comprehensive information.

For example, unique structured information on a military product sales website is mapped to an "other" type in a product type pragmatic keyword classification in a preset structural item in the template for accurate search of comprehensive information, and a unique pragmatic keyword (for example, a special code) of a military product is mapped to an "other" item in a product type pragmatic keyword classification in a preset structural item in the template for accurate search of comprehensive information.

Step 303: When the search operation instruction in Embodiment 1 is executed, use a general topic keyword, a pragmatic keyword, and a common keyword that are obtained in the template for accurate search of comprehensive information in the present invention to match various keywords in various types of structured information and structured summary information that have already established a mapping relationship with the template for accurate search of comprehensive information.

Step 304: If the matching succeeds, directly invoke and output various types of structured information that is matched successfully for displaying.

Directly invoking and outputting various types of structured information that is matched successfully may be displaying the invoked information by using structural items in the template for accurate search of comprehensive information, or may be displaying the invoked information by using user-defined structural items in various types of structured information databases.

Practical value of Embodiment 3 of the present invention is that an objective of searching for various types of structured information and structured summary information directly in accurate search of comprehensive information can be achieved.

In conclusion, the present invention has the following main creativity and practical value:

1. Improving efficiency of comprehensive search of Internet information substantially: In the present invention, pragmatic keyword coordinates having general value are provided for any search keyword; an obtained Internet information search keyword is used to clearly distinguish a general topic keyword, a pragmatic keyword, a common keyword, and a free combination result thereof and search for various types of structured information, structured summary information, semi-structured information unstructured information, and structured mapping information concurrently. In this way, a user can implement complete search and accurate search of information in one search operation, which improves the efficiency of comprehensive search of Internet information substantially and will replace the existing full-text keyword search solution in the field of comprehensive search of Internet information.

2. Greatly reducing a user search cost: Compared with existing mainstream search methods on the Internet such as full-text keyword search and vertical search of structured information, the present invention (referring to FIG. 6) greatly reduces a mental labor cost and a manual operation cost of a user in finding needed target information.

3. Improving quality and availability of a search result summary of Internet information substantially: Target information needed by a searching user is clearly locked and related target information is directly invoked. Compared with a method for extracting a context of a hit keyword in the existing full-text keyword search, the quality and availability of the obtained search result summary are improved substantially.

4. Abundant and simple implementation methods: In the present invention and related inventions, a pragmatic keyword is automatically notated for a webpage information keyword, which directly improves efficiency of search of unstructured information; general structured information uploaded by a user may also be searched for directly in webpage information; further, a mapping relationship may be established between structural items in a template for accurate search of comprehensive information and structural labels in existing various information release platforms, so that various types of structured information and structured summary information on other websites outside the existing system are automatically integrated for a user to search and compare, which substantially improves information propagation efficiency of various types of structured information.

5. Bringing about important application value in related fields: Implementation of the present invention and related patents will not only improve efficiency of comprehensive search of Internet information, but also bring about important application value in the following related fields: for example, establishing a cloud storage website and personal virtual portal featuring a convenient operation and high search efficiency, implementing a multipoint hypertext link, providing real-time content updates for positioning and search on a mobile phone, placing an advertisement on the mobile Internet, and big data mining of Internet information.

REFERENCE

"METHOD AND APPARATUS FOR ORGANIZING WEBSITE INFORMATION", Chinese Patent Application No. 201210281392.4

"METHOD AND APPARATUS FOR MULTIPOINT HYPERTEXT LINK", Chinese Patent Application No. 201210182154.8

A person skilled in the art should understand that the embodiments of the present invention can be provided as a method, a system, or a computer program product. Therefore, the present invention can adopt a form of an embodiment of hardware only, an embodiment of software only, or an embodiment of a combination of software and hardware. In addition, the present invention may adopt a form of a computer program product that can be implemented in one or more computer usable storage media (including but not limited to a magnetic disk memory and an optical memory) including computer usable program code.

The present invention is described with reference to a flowchart and/a block diagram of the method, the device (system), and the computer program product according to the embodiments of the present invention. It should be understood that computer program instructions may be used to implement each process and/or each box in the flowchart and/or the block diagram and a combination of processes and/or boxes in the flowchart and/or the block diagram. These computer program instructions may be provided to a processor in a general-purpose computer, a dedicated computer, an embedded processor, or other programmable data processing devices to produce a machine, so that the processor in the computer or other programmable data processing devices executes the instructions to produce an apparatus that implements a specified function in one process or multiple processes of the flowchart and/or one boxes or multiple boxes of the block diagram.

These computer program instructions may also be stored in a computer readable memory that can boot a computer or other programmable data processing devices to work in a specified manner, so that instructions stored in the computer readable memory produce a manufactured product including an instruction apparatus, where the instruction apparatus implements a specified function in one process or multiple processes of the flowchart and/or one boxes or multiple boxes in the block diagram.

These computer program instructions may also be loaded to a computer or other programmable data processing devices, so that a series of operation steps are executed in the computer or other programmable devices to produce processing implemented by the computer, and further instructions executed in the computer or other programmable devices provide steps of implementing a specified function in one process or multiple processes of the flowchart and/or one box or multiple boxes of the block diagram.

Apparently, a person skilled in the art may make various modifications and variations to the present invention without departing from the scope of the present invention. Therefore, if the modifications and variations made to the present invention fall within the scope of claims of the present invention and equivalent technologies thereof, the present invention should be intended to include these modifications and variations.

We claim:

1. A method for accurate search of comprehensive information, comprising the following steps:

using a computer system comprising one or more processors and one or more memory devices to perform a search;

outputting a general topic keyword text box in a template for accurate search of comprehensive information, an alternative pragmatic keyword template, a common keyword text box under a pragmatic keyword, a search data type option, a search scope option, and a search operation instruction identifier;

obtaining, in the general topic keyword text box, a general topic keyword entered by a searching user, obtaining, in the alternative pragmatic keyword template, a pragmatic keyword or a pragmatic keyword classification item selected by the searching user, and obtaining, under the pragmatic keyword selected by the user, a common keyword entered by the searching user;

obtaining a search data type selection result and a search operation instruction, and before executing the search operation instruction, judging whether the obtained search keyword comprises only the pragmatic keyword, wherein when the judgment result is "Yes", outputting prompt information "please enter a keyword" or a synonym, and not executing the search operation instruction and when the judgment result is "No", executing the search operation instruction, and using the obtained general topic keyword, the pragmatic keyword, the common keyword, and a combination result thereof to match various keywords in structured information, structured summary information, semi-structured information, and unstructured information of release information;

using the obtained general topic keyword, the pragmatic keyword, and the common keyword to match various keywords in various types of structured release information that is on other websites outside the computer system and has already established a structural label mapping relationship with structural items in the template for accurate search of comprehensive information; and wherein when the obtained search keyword and the combination result match the keywords in the release information successfully, invoking corresponding information of the successfully matched structured information, structured summary information, semi-structured information, unstructured information, and various types of structured release information that has already established a structural label mapping relationship with the structural items in the template for accurate search of comprehensive information, for displaying, wherein obtaining a pragmatic keyword classification item in the output alternative pragmatic keyword template is equivalent to obtaining all pragmatic keywords of the classification; the obtained pragmatic keywords are from a multiple-choice result; and the common keyword that is entered by the user and obtained under the selected pragmatic keyword is from multiple common keywords entered under multiple selected pragmatic keywords; and wherein the method for obtaining a general topic keyword, a pragmatic keyword, and a common keyword further comprise the following steps:

when obtaining the pragmatic keyword selected by the searching user, synchronously obtaining an application function selection result of the pragmatic keyword;

when the obtained application function selection result of the pragmatic keyword is "invoke related information" and a synonym, determining that the obtained pragmatic keyword is a pragmatic keyword indicating an invoked information scope of the obtained general topic keyword; and when the obtained application function selection result of the pragmatic keyword is "enter a keyword in a specified scope" and a synonym, outputting a search keyword input interface under the pragmatic keyword, and obtaining a common keyword entered under the pragmatic keyword, wherein:

before using the obtained general topic keyword, the pragmatic keyword, and the common keyword to match various keywords in various types of structured release information that is on other websites outside the computer system and has already established a structural label mapping relationship with structural items in the template for accurate search of comprehensive information, the method further comprises the following steps:

outputting a template for setting a mapping relationship between preset structural items in the template for accurate search of comprehensive information and structural labels in the structured release information and structured summary release information on other websites outside the computer system; and obtaining a result of setting the mapping relationship between the preset structural items in the template for accurate search of comprehensive information and the structural labels in various types of structured release information on other websites outside the computer system.

2. The method for accurate search of comprehensive information according to claim 1, wherein the method for using the general topic keyword, the pragmatic keyword, the common keyword entered under the pragmatic keyword, and a combination result thereof to match structured summary information, common structured information, semi-structured information, and unstructured information, and invoking the successfully matched structured summary information, common structured information, structured mapping information, semi-structured information, and unstructured information, for displaying further comprises the following steps:

when the obtained search keyword and combination result are used to match a keyword in the structured information, the structured summary information, and various types of structured release information that is on other websites outside the computer system and has already established a structural label mapping relationship with the structural items in the template for accurate search of comprehensive information, wherein when the obtained search keyword comprises only a general topic keyword, matching a release information keyword under structural labels "topic keyword" and "title" of the structured release information, and also matching structural labels of various types of structured information; wherein when the matching succeeds, invoking the whole piece of structured information that is matched successfully for displaying and when the obtained search keyword comprises a general topic keyword and a pragmatic keyword of which the application function is "invoke related information", after the general topic keyword is matched successfully, judging whether there is content under a structural label of the release information matching the pragmatic keyword, wherein when the judgment result is "Yes", invoking structured information that matches both the general topic keyword and the pragmatic keyword successfully for displaying; and when the obtained search keyword comprises a general topic keyword, a pragmatic keyword, and a common keyword obtained under the pragmatic keyword, using the obtained search keyword to match corresponding information in the structured release information in a combined manner and in an individual manner, wherein when the matching succeeds, invoking structured information that is matched successfully in a combined manner for displaying; or when the obtained search keyword and combination result are used to match a keyword in the semi-structured information and the unstructured information, wherein when the obtained search keyword comprises only a general topic keyword, using the obtained general topic keyword to match a keyword in a full-text keyword ordering table, and also using the obtained general topic keyword to match an annotation word of a pragmatic keyword in the release information, and invoking release information that is matched successfully for displaying; and when the obtained search keyword comprises a general topic keyword and a pragmatic keyword or comprises a general topic keyword, a pragmatic keyword, and a common keyword obtained under the pragmatic keyword, using the obtained general topic keyword and common keyword to match a keyword in the full-text keyword ordering table, using the obtained pragmatic keyword to match an annotation word of a pragmatic keyword in the release information, and using the obtained pragmatic keyword to match a keyword that can be clearly determined as a pragmatic keyword in the full-text keyword ordering table, wherein when the matching succeeds, invoking information successfully matching the keyword that can be clearly determined as a pragmatic keyword for displaying.

3. The method for accurate search of comprehensive information according to claim 1, wherein the method for obtaining a result of setting the mapping relationship between the preset structural items in the template for accurate search of comprehensive information and the structural labels in various types of structured release information further comprises:

outputting a template for setting a mapping relationship between preset structural items in the template for accurate search of comprehensive information and structural labels in other structured release information and structured summary release information; and obtaining a result of setting the mapping relationship between the preset structural items in the template for accurate search of comprehensive information and the structural labels in various types of structured release information, wherein:

one preset structural item in the template for accurate search of comprehensive information have a mapping relationship with multiple structural labels in a template for releasing other structured information;

the obtained mapping relationship between the preset structural items in the template for accurate search of comprehensive information and the structural labels in the template for releasing other structured information may be an incomplete mapping relationship; and the outputting a template for setting a mapping relationship between the preset structural items in the template for accurate search of comprehensive information and structural labels in other structured information, the structured summary information, and various types of structured release information that has already established a structural label mapping relationship with the structural items in the accurate template for accurate search of comprehensive information outputting a template for setting a mapping relationship of structural labels in the structured summary information and a template for setting a mapping structural labels in the common structured information respectively, or outputting a mixed template for setting a mapping relationship of structural labels in the structured summary information and a mapping relationship of structural labels in the common structured information.

4. The method for accurate search of comprehensive information according to claim 1, wherein when the obtained search keyword and the combination result match the keywords in the release information successfully, the method for invoking corresponding information of the successfully matched structured information, structured summary information, semi-structured information, unstructured information, and various types of structured release information that has already established a structural label mapping relationship with the structural items in the template for accurate search of comprehensive information, for displaying further comprises:

displaying the invoked information by using the structural items in the template for accurate search of comprehensive information, or displaying the invoked information by using user-defined structural items in various types of structured information databases.

* * * * *